Patented Mar. 7, 1939

2,149,948

UNITED STATES PATENT OFFICE 2,149,948

SOLVENT

Glenn F. Zellhoefer, Normal, and Carl S. Marvel and Michael J. Copley, Urbana, Ill.; said Marvel and said Copley assignors to said Zellhoefer No Drawing. Application February 16, 1938, Serial No. 190,728

13 Claims. (Cl. 252—5)

The present invention relates to refrigeration, and more particularly to refrigeration by means of the absorption principle.

One of the objects of the present invention is to provide an improved working fluid for an absorption refrigerating machine.

A further object is an improved refrigerant-solvent combination wherein the refrigerant forms a thermally unstable, loose molecular compound with the solvent, apparently by intermolecular hydrogen bonding.

A still further object is an improved absorption medium, which permits the satisfactory use of certain halogenated hydrocarbons as refrigerants in an absorption refrigerating machine.

Other objects will be apparent as the invention is hereinafter more fully described.

The foregoing objects may be accomplished in accordance with the present invention, one aspect of which comprises a working fluid for an absorption refrigerating system, which fluid comprises a relatively volatile, chemically and thermally stable, hydrogen-containing halogenated hydrocarbon as a refrigerant, and a relatively non-volatile organic compound containing within its molecular structure at least one effective donor nitrogen atom, as the absorbent or solvent for said refrigerant.

As indicated above, the refrigerants contemplated by the present invention embrace the class of hydrogen-containing hydrocarbons, such as those which have at least one bivalent halo methylene group or radical:

where X is a halogen. This type of structure is found, for example, in compounds of the general formula—

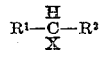

where X is a halogen R¹ and R² are either hydrogen, halogen alkyl, halo alkyl, or the like, either the same or different.

In addition to possessing the foregoing structural characteristics, the refrigerant should be characterized by chemical and thermal stability. In other words, the refrigerant should be a halogenated hydrocarbon of the class indicated, which may be heated to the highest temperatures ordinarily encountered in an absorption refrigerating machine, without irreversibly decomposing into a different molecular specie or species. Furthermore, the halogenated hydrocarbon should not enter into a non-reversible chemical reaction with the solvents or absorbents of the present invention. Nevertheless, it is important to observe that the foregoing requirement of chemical and thermal stability does not preclude the formation of a thermally unstable, loose molecular compound.

It is not absolutely essential, for the purpose of the present invention, that the refrigerant, in its chemically pure state, should be chemically and thermally stable, for it is well known that many halogenated hydrocarbons which are somewhat unstable in the pure state may be rendered substantially stable by adding thereto very small amounts of a suitable stabilizer such as ethanol, pinene, and the like. Stabilizers for this purpose are well known to manufacturers of halogenated hydrocarbons, and in certain instances it appears that a suitable stabilizer is added, as a matter of course, by the producer of compounds of this class, regardless of whether the consumer requests a stabilized grade or not. Where a stabilizer is desired for any particular halogenated hydrocarbon, the most effective material for this purpose can readily be determined by those skilled in the art.

For the purpose of illustrating the principles of the present invention more clearly, the following hydrogen-containing halogenated hydrocarbons may be mentioned as examples of refrigerants which may be used in accordance with the present invention: Methyl chloride, methylene chloride, dichloromonofluoromethane, and the like. The ordinary commercial grade of the foregoing refrigerants is suitable within the meaning of the present invention, and the foregoing remarks regarding stabilizers are of particular interest in connection with other solutes which may be employed as refrigerants if desired, in place of those particularly mentioned.

The solvent or absorbent in accordance with the present invention comprises a relatively non-volatile, liquid organic nitrogen compound which is capable of forming a loose molecular compound with the solute or refrigerant. The absorbent or solvent may be more particularly defined by the following characteristic, fundamental, or inherent properties thereof:

1. The compound contains within its molecular structure at least one effective donor nitrogen atom, i. e., a nitrogen atom which has in its outer or valence electron shell or orbit, at least one pair of unshared valence electrons, which is capable of forming a thermally unstable, loose molecular type of compound with the hydrogen-containing halogenated hydrocarbon.

From the foregoing statement, it will be observed that the compound may contain more than one donor nitrogen atom. It is important to note, however, that in all cases, regardless of whether the compound contains one or many nitrogen atoms, at least one of these atoms must be an effective donor nitrogen atom, i. e., it must have an unshared pair of valence electrons capable of forming a thermally unstable, loose molecular type of compound, apparently by virtue of the hydrogen bond. Where a compound contains more than one nitrogen atom, it is desirable, in order to achieve the maximum solubility, to avoid certain negative factors such as steric hindrance, strongly electro-negative groups adjacent to the nitrogen atoms, active hydrogen atoms within the molecule, and the like. Nevertheless, a compound containing negative factors adjacent to one or more nitrogen atoms may still possess good solubility characteristics, provided it has at least one effective donor atom in addition to those which are rendered substantially non-effective by the above-mentioned negative factors. In addition to avoiding negative factors, it is also desirable to avoid increasing the molecular weight of the solvent by means of large inert groups which do not contain additional donor atoms, since the gram per gram solubility usually falls off with an increase in molecular weight, unless the increase is compensated by the presence of additional donor atoms.

2. The absorbent should be thermally stable over a relatively wide range, for example, between about 0° F. and about 260° F.

3. The absorbent should be chemically inert with respect to the refrigerant (and preferably also with respect to the materials normally used in the construction of the refrigerating machine) within a wide temperature range, for example, between about 0° F. and about 260° F.

4. Preferably, but not necessarily, the absorbent should be a liquid having a relatively low viscosity index, even at low temperatures, in order to obtain good heat exchange properties. A further reason for preferring a liquid of low viscosity is that this property appears to be associated in most cases with good solubility characteristics. Thus, it has been found in numerous instances that a compound of high viscosity index is characterized by poor solubility characteristics, even though the compound contains the group or linkages normally associated with high solvent capacity. Although this correlating of solubility and viscosity has been frequently observed, it cannot be definitely asserted at this time that such is universally true.

5. Preferably, but not necessarily, the absorbent should have a negligible vapor pressure at about 260° F., and a freezing point below room temperature or even lower.

In the foregoing description, a suitable absorbent has been broadly defined in terms of its fundamental properties. In order to illustrate the nature of the present invention as clearly as possible, certain specific examples of the type of absorbent contemplated by the present invention will now be described. It should be borne in mind, however, that these examples are merely illustrative of the type of compounds which are above defined in terms of their inherent or fundamental characteristics or properties; and that the invention is by no means restricted to the following specific embodiments:

(a) Basic nitrogen compounds such as dimethyl aniline, quinoline, and the like.

(b) Amides such as N-methyl-N-acetylcyclohexylamine, N-ethyl-N-acetylcyclohexylamine, acetylpiperidine, tetraethyloxamide, and the like.

(c) Amide-esters such as ethyl di-N-ethyl-malonamidate, di-N-carbethoxypiperazine, and the like.

All of the foregoing nitrogen-containing solvents are old compounds except tetraethyloxamide and ethyl di-N-ethyl malonamidate. These two compounds are new in themselves, and were prepared as follows:

Tetraethyloxamide

To a cooled solution of ethylmagnesium bromide (1.64 moles) in benzene and ether was added 100 g. (1.37 moles) of diethyl amine in 100 cc. of benzene. After the addition was complete, the mixture was refluxed, with stirring, for an hour, when the evolution of gas had ceased. Two hundred fifty cubic centimeters of benzene was added.

The source of heat was removed, and a solution of 107 g. (0.685 moles) of diethyloxalate in 150 cc. of benzene was added over a one-hour period. As the ester was added, the mixture became more viscous and difficult to stir. It was seated to refluxing towards the end of the addition to help in mixing. Refluxing and stirring were continued for three hours.

After standing at room temperature for seven hours, the reaction mixture was decomposed with cold, dilute hydrochloric acid. The benzene layer was washed with water and sodium bicarbonate solution, and dried over sodium sulfate. The residue remaining after distillation of the benzene was distilled at 15 mm. until the temperature reached 130°. The remainder, crude tetraethyloxamide, was distilled at 1.5 mm.

The hydrochloric acid solution and wash water were saturated with sodium sulfate and extracted several times with chloroform. The chloroform solution was washed with sodium bicarbonate solution, dried and distilled. The crude tetraethyloxamide thus obtained was combined with that obtained above and distilled from a modified Claisen flask. The product, B. P., 105–110° C./1.5 mm., crystallized on cooling. Yield, 83 g. (60.5 per cent of the theoretical).

Ethyl di-N-ethylmalonamidate

A solution of ethylmagnesium bromide was prepared by adding 262 g. (2.4 moles) of ethyl bromide to 58.5 g. (2.4 atoms) of magnesium in 500 cc. of absolute ether. To this solution in a 3-liter flask was added 500 cc. of dry benzene. The mixture was distilled until the temperature of the vapor reached 71°. Two hundred cubic centimeters of benzene was added.

Over a period of forty minutes, 146 g. (2 moles) of diethyl amine in 100 cc. of benzene was added to the stirred reaction mixture. During the addition, the solvent refluxed vigorously, and ethane was evolved. The refluxing was continued for an hour when the gas evolution had ceased.

To the stirred reaction mixture, there was added, without heating, 161 g. of diethylmalonate in 150 cc. of benzene. During the addition, which required thirty minutes, there was vigorous refluxing. The mixture became olive brown in color. Refluxing was continued for three hours. When stirring was stopped, a clear layer separated on top of the benzene.

The reaction mixture was decomposed with cold dilute hydrochloric acid. The water layer was washed with chloroform. The chloroform and benzene solution were washed with sodium bicarbonate solution, dried and distilled. The first fraction was collected up to 110°/1.5 mm., and the second, from 110° up. These fractions were redistilled in a modified Claisen flask. Twenty-nine grams of malonic ester was recovered. There was obtained 126 g. of a product; B. P., 106-109° (1.5 mm.);

$n_D^{20}$, 1.4529; $n_{20}^{20}$, 1.030.

The analysis and molecular refractivity indicate the product to be the ester amide, $C_2H_5OCOCH_2CON(C_2H_5)_2$, containing small quantities of tetraethylmalonamide.

Of the nitrogen-containing solvents mentioned in the foregoing list, the more basic compounds such as the amines are corrosive to a certain degree when in contact with the metals normally used in the construction of equipment. Apparently this is due to the combination of the basic compound with acids such as hydrochloric acid, the resulting amine hydrochloride being very corrosive in nature. For this reason, where the basic nitrogen compounds are employed, care should be taken to avoid contamination of the material with the amine salts, and as an additional precaution it is desirable to employ corrosion-resistant materials in the construction of the equipment. Inasmuch, however, as corrosion-resistant alloys are generally costly, the nitrogen compounds such as the amides or the amide esters are preferred embodiments of the present invention, where the solvents are employed under severe conditions such as those prevailing in an absorption refrigerating machine. These compounds may generally be employed in the usual absorption refrigerating machine without the necessity of taking special precautions to guard against corrosion.

The foregoing description has been directed largely to the characteristics of the components or the constituents of the present working fluid, and from the details given it will be apparent that a large number of specific combinations may be devised. A description of each combination would, of course, be superfluous, and it will be sufficient to describe merely a few specific embodiments which are characteristic of the type of working fluid embraced within the scope of the present invention. In the following detailed description, however, it should be borne in mind that the invention is by no means restricted to the specific embodiments of the following examples, which are cited merely for the purpose of illustrating the properties of the combination in accordance with the present invention.

The solubility characteristics of several specific embodiments of the working fluid in accordance with the present invention are given in the table.

Table

| Solvent | Solute | |
|---|---|---|
| | $CHCl_2F$ | $CH_2Cl_2$ |
| 1 Acetyl piperidine | 1.32 | |
| 2 N-acetyl-N-methylcyclohexylamine | | 0.6 |
| 3 N-acetyl-N-ethyl-cyclohexylamine | | 0.56 |
| 4 Tetraethyloxamide | 0.96 | |
| 5 Ethyl-di-N-ethylmalonamidate | 0.95 | |
| 6 Mixture of #2 and #3 | 1.02 | |

In the foregoing table, solubility is expressed in terms of grams refrigerant per gram solvent, when the solvent is maintained at 90° F. and the pressure over the solution corresponds to the vapor pressure of the liquid refrigerant at 40° F. For dichloromonofluoromethane, the pressure corresponds to 4½ inches of vacuum; and for methylene chloride the pressure corresponds to 23 inches of vacuum.

In order still more clearly to illustrate the working fluid in accordance with the present invention, a specific example will now be described in considerable detail. It should be understood, however, that this is done solely by way of example, and is not to be construed as a limitation upon the scope of the appended claims.

Example

A preferred application of the present invention comprises a group of co-operating substances for an absorption type refrigerating machine, such as the two-fluid type, for example. As a refrigerant, dichloromonofluoromethane was selected because of its non-toxic properties; and as the absorbent, acetyl piperidine was chosen because of its excellent solubility characteristics, and the ready availability of the raw materials required for its manufacture. With the solvent at 90° F., the gram per gram solubility of dichloromonofluoromethane in acetyl piperidine was found to be practically a linear function of the gas pressure, between the limits of about 1 inch to about 15 inches of mercury vacuum. At 15 inches of vacuum, one gram of solvent absorbs approximately 0.75 gram of the refrigerant; and at about 1 inch vacuum, one gram solvent absorbs approximately 1.4 grams of solute. Upon the application of heat to this solute-solvent combination, the refrigerant may be readily expelled therefrom. From calculations based on Raoult's law, utilizing the partial pressure of the solute, it was found that the actual solubility was considerably in excess of the calculated solubility, the enhancement probably being due to loose molecular compound formation between the solute and the solvent.

The term "organic compound" as employed in the present specification and in the appended claims is to be understood in its broadest sense. It embraces the compounds of carbon, whether or not the compound also includes inorganic atoms such as halogen or the like.

The term "steric hindrance" as employed herein is a loose relative term, but as it is generally understood, it denotes such a degree of hindrance that the normal reactions characteristic of the same general type of compound are either materially slowed down, or as a practical matter, effectively prevented. It is in this sense that the term is used in the present specification. Figuratively speaking, the donor atom is "buried" within the molecule, and the effect may be described as a substantial loss of ability to share electrons with hydrogen, due to the configuration of the molecule.

The term "strongly electro-negative group" refers to such groups as halogen, unsaturated carbon-carbon linkages (for example, carbon-carbon double bond) and the like. Such linkages, if adjacent to the donor nitrogen atom, suppress its tendency to share electrons with hydrogen. It is important to note, however, that a carbon atom adjacent to the donor nitrogen atom may be, and in fact preferably is, attached to an oxygen atom by a double bond, as, for example, in compounds having the characteristic amide linkage. The carbon-oxygen double bond is therefore not a strongly electro-negative group, as this term is employed in the present specification.

"Active hydrogen atom" is another loosely defined term, and may be exemplified by the hydrogen atom attached to an oxygen or nitrogen atom, as in hydroxy compounds, primary or secondary amines, and the like. The effect of such hydrogen atom is probably due to intermolecular association of solvent molecules by hydrogen bonding therebetween.

The term "chemically inert", as used in the present specification, does not preclude the formation of loose molecular type of compounds between the refrigerant and the solvent, but refers only to chemical stability in the sense that a non-reversible chemical reaction between the solvent and the refrigerant or the materials of the construction should not take place.

In the foregoing detailed description of the present invention, certain aspects thereof have been illustrated by reference to an absorption refrigerating system of the two-fluid type. It should be understood, however, that the invention may be used, if desired, in the Platen-Munters three-fluid system, by supplementing the disclosed two-fluid combination with a third fluid such as hydrogen. It will also be apparent that the absorbent or solvent of the present invention may be utilized for other purposes besides the production of cold. Thus, for example, the nitrogen compounds in accordance with the present invention may be employed merely for the purpose of absorbing hydrogen-containing halogenated hydrocarbons from gases and vapors containing the same, regardless of whether or not the resulting solution is subsequently employed for the production of cold. This and many other variations will be evident to those skilled in the art. The present invention is therefore to be restricted only in accordance with the following patent claims.

We claim:

1. A working fluid for an absorption refrigerating system, which comprises a relatively volatile chemically and thermally stable hydrogen-containing halogenated hydrocarbon as a refrigerant, and a relatively non-volatile, liquid amide as the absorbent for said refrigerant.

2. A working fluid for an absorption refrigerating system, which comprises a relatively volatile, chemically and thermally stable, hydrogen-containing halogenated hydrocarbon as a refrigerant, and a relatively non-volatile, low-viscosity liquid amide of a secondary organic amide, as the absorbent for said refrigerant.

3. The working fluid of claim 2 wherein said amide is the amide of a cyclic secondary amine.

4. The working fluid of claim 2 wherein said amide is acetyl piperidine.

5. The working fluid of claim 2 wherein said amide is N-acetyl-N-methylcyclohexylamine.

6. The working fluid of claim 2 wherein said amide is N-acetyl-N-ethylcyclohexylamine.

7. The working fluid of claim 2 wherein said refrigerant is hydrogen-containing halomethane.

8. The working fluid of claim 2 wherein said refrigerant is methylene chloride.

9. The working fluid of claim 2 wherein said refrigerant is dichloromonofluoromethane.

10. The working fluid of claim 1 wherein said amide is an N-disubstituted amide.

11. The working fluid of claim 1 wherein said amide contains an ester group.

12. In the process of absorbing vapors and gases of hydrogen-containing halogenated aliphatic hydrocarbons, the step which includes contacting said vapors and gases with an absorption medium comprising a relatively non-volatile liquid amide.

13. A working fluid for an absorption refrigerating system which comprises a relatively volatile hydrogen-containing halogenated aliphatic hydrocarbon as a refrigerant and a relatively non-volatile, liquid unhalogenated organic compound containing a trivalent nitrogen atom all bonds of which are linked to carbon.

GLENN F. ZELLHOEFER.
CARL S. MARVEL.
MICHAEL J. COPLEY.

Certificate of Correction

Patent No. 2,149,948.                                                                                                March 7, 1939.

GLENN F. ZELLHOEFER ET AL.

It is hereby certified that errors appear in the printed specification of the above numbered patent requiring correction as follows: Page 1, first column, line 44, for "halogen R'" read *halogen and R'*; page 3, first column, line 4, in the formula, for "$n_{20}^{2}$" read $d_{20}^{20}$; and that the said Letters Patent should be read with these corrections therein that the same may conform to the record of the case in the Patent Office.

Signed and sealed this 25th day of April, A. D. 1939.

[SEAL]             Henry Van Arsdale

*Acting Commissioner of Patents.*